Sept. 11, 1951     T. F. PETERSON, JR     2,567,395
PERPETUAL CALENDAR
Filed Dec. 6, 1948     3 Sheets-Sheet 1
FIG. 1
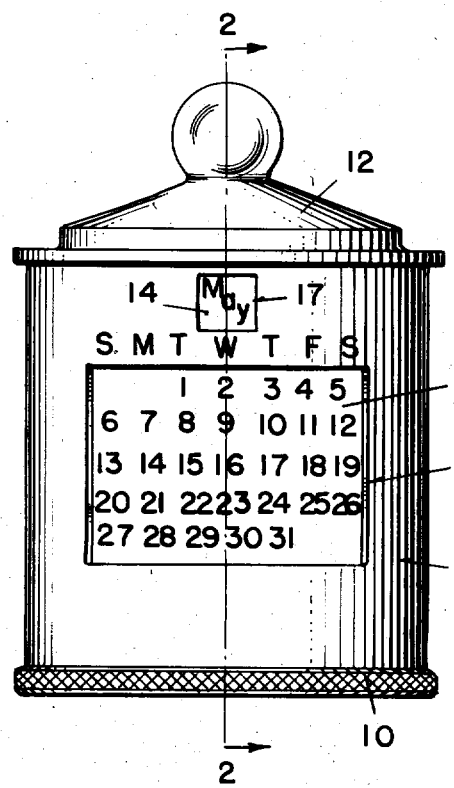
FIG. 2
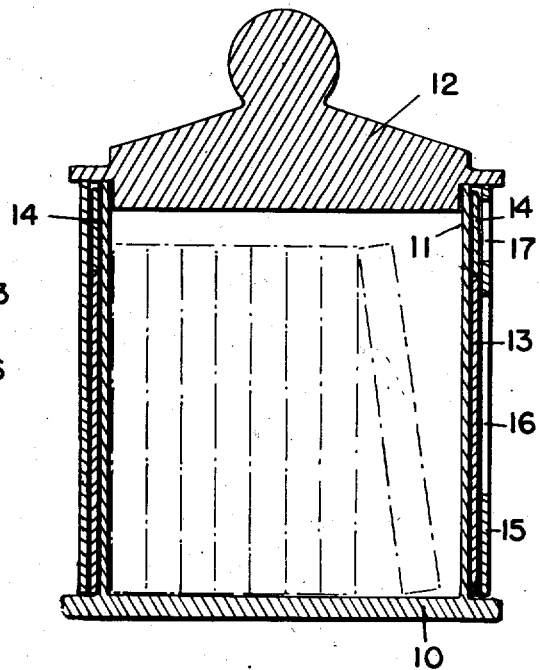
FIG. 7
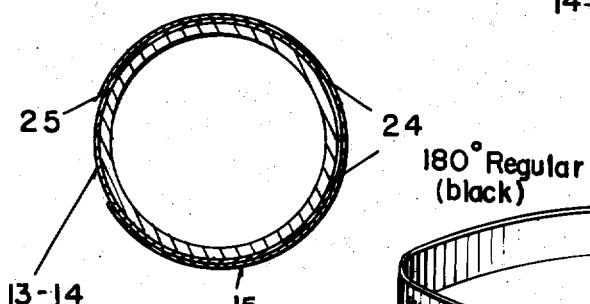
FIG. 8
FIG. 9
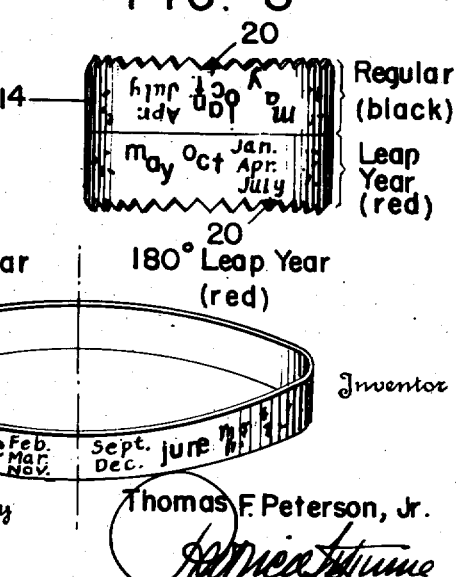
Inventor
Thomas F. Peterson, Jr.
ATTORNEY Sept. 11, 1951     T. F. PETERSON, JR     2,567,395
PERPETUAL CALENDAR Filed Dec. 6, 1948     3 Sheets—Sheet 2

Inventor:
Thomas F. Peterson, Jr.
By
Attorney

Sept. 11, 1951     T. F. PETERSON, JR     2,567,395
PERPETUAL CALENDAR

Filed Dec. 6, 1948     3 Sheets-Sheet 3

Inventor:
Thomas F. Peterson, Jr.

Patented Sept. 11, 1951

2,567,395

UNITED STATES PATENT OFFICE 2,567,395

PERPETUAL CALENDAR

Thomas F. Peterson, Jr., Shaker Heights, Ohio

Application December 6, 1948, Serial No. 63,710

3 Claims. (Cl. 40—111)

This invention relates to calendars and more specifically to those calendars commonly called "perpetual," which are composed of several elements, one of which carries the number data arranged in seriatim repetitively in coordinates of seven, and another of which carries week day designations, which elements may be mutually adjusted to represent the week day name and number relationship for any preselected month.

Ordinarily, devices of this kind are limited to the number table and the week day designating mask for the number table, which may be adjusted relative to each other without provision being made for the representation of the month to which any particular position of association may pertain in a coordinated manner. If devices of this kind do provide for the display of a particular month, this display is independently operated with respect to the other elements, and is not coordinated therewith to reveal the correct setting of the several elements in presenting the numbers to the days of the week in correct relation for that month. Thus, whether the month is actually displayed or not, there has not been heretofore any means for determining whether or not a calendar, once properly set, has got out of adjustment for the intended month, and, thus, it frequently occurs that the calendar misrepresents the date which should apply at the time of use.

Proposals have been made to prevent this type of error from arising, but by virtue of the variables between months wherein some have a greater number of days than the others, it has not heretofore been feasible to correlate these factors in a useful way without making the device unduly complicated. To the variables of the number of days in a month in relation to the days in a week there is added another variable in perpetual calendars which extends over a period of years. This variable is concerned with the fact that every fourth year is a leap year, presenting one more calendar day than is the case in the regular intervening years. Thus, whereas 1947 was a regular year presenting 365 days in the ordinary calendar cycle, the current year is leap year and presents 366 days with relation to which the normal sequence from year to year is disarranged.

The calendar of the present invention, in addition to affording the usual functions of presenting number data in relation to week day designations, as is customarily done in devices of this kind, further provides that the month of application be revealed when the correct number and week day designation association is realized, and that the variables attendant upon the days of the month for both regular years and leap years are automatically compensated for, requiring that the calendar be arranged only once at the commencement of a year. Thereafter, the calendar may be operated continuously through the year by the expediency of adjusting the masking element (which usually bears the week day designations) to present the month name in a viewing aperture, by which adjustment the proper correlation between the week day designations and the date numbers is automatically effected for the month shown.

Specifically, the invention contemplates an elemental surface containing number data arranged in seriatim repetitively in coordinates of seven, and another separate elemental surface for association with the number data element, upon which month names or designations are displayed. One of these two elements, preferably the number data element, carries a datum line, or reference point, for use with the yearly indicia carried upon the other element. This latter datum line, or reference point, is associated with the month January as a matter of convenience, since the calendar year starts with that month, although it is not preclusive in practicing the invention that this association be effected with any other month of the year as best suits the convenience of the user; e. g., on calendars especially concerned with fiscal years, this reference point may be associated with July, or any other month within the contemplation of the user. For the year in question, by bringing the datum line, or reference point, of the one element into registration with the yearly indicia for the year in question of the other element, a proper association is effected so that when the calendar is viewed through a masking device containing week day designations in association with apertures through which the number data and the monthly designations may be viewed, while masking all other inapplicable portions, the correct calendar for the month is obtained. By moving the masking device with relation to the successive months of the year in question, the proper correlation between number dates and week day names is successively obtained throughout the year without further adjustment of the elements. It is further contemplated that month-by groupings for regular years and month-ly grouping for leap years be provided for interchangeable use with the number data element to render the calendar adaptable for continuous use for terms exceeding four years. It is intended that the leap year indicia and the leap year month groups be distinctively displayed in order that they may not be confused with the regular year indicia and month groups. It is suggested that a simple way for giving effect to this is to make them in contrasting colors, whereby the association of like colors will effect the proper relationship for any given year which will maintain throughout that year.

The invention is specifically illustrated in the accompanying specification and drawings, in which like characters of reference refer to like parts throughout. In the drawings, Figure 1 is a front elevational view of one embodiment of the invention.

Figure 2 is a vertical midsectional elevational view taken along line 2—2 of Figure 1 looking in the direction of the arrows.

Figures 3 and 4 represent month name groupings carried on bands for regular years and leap years, respectively.

Figure 5 is a front view of a number table or data element carrying the numbers in seriatim and repeating coordinately in groups of seven, and which also carries yearly indicia with which the elements of Figures 3 and 4 are adapted to be associated.

Figure 6 is a fragmentary elevational view of a detail of the invention.

Figure 10:
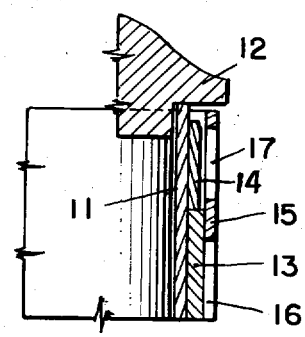

Figures 7 to 11, inclusive, show various modifications of certain parts of the invention as will hereinafter appear.

Although it is not intended to limit the invention to any over-all shape or form, since its principles are equally applicable to flat planar types of calendars, or to rotatory disc types of calendars, or to cylindrical embodiments, the last has appeared as one convenient and acceptable form which has been adopted herein for purposes of illustration. Therefore, considerations attendant upon the use of the elements of Figures 3, 4 and 5 are herein more particularly addressed to the forms shown in Figures 8 and 9, so as to give effect to the cylindrical embodiments shown in Figures 1 and 2. It will be understood, however, that these are limitations of form rather than of substance, and any desired shape and form of calendar in which the principles of this invention are applicable are within the contemplations of the invention, the scope and spirit of which is apprehended in and by the appended claims.

Referring now more particularly to the drawings, the invention as illustrated is assembled upon a base 10 with which is associated in rigidly affixed relation upstanding cylindrical walls 11, which may be fitted with a crown or cap 12 to present a finished appearance to the calendar, or for the purpose of affording a closure in the embodiments wherein the walls 11 are hollow for the reception of contents such as cigarettes, memo leaves, etc. This is incidental to the invention, since the upstanding walls 11 may represent surface areas of a solid cylinder if this form is preferred.

Circumjacent to the walls 11 is a number data element 13 which contains number data arranged in seriatim repetitively in coordinates of seven, as appears specifically in Figure 5. In the embodiment of Figures 1 and 2, this number data element 13 is constituted as an open ended sleeve adapted to slide over and snugly fit the wall 11 of the base 10 with respect to which it may, or may not, have relative movement.

Arranged concentrically with respect to the number data element 13, a smaller sleeve or band 14 of the same diameter is adapted to rest in adjustable coaxial relation to the element 13. It should be noted here that it is not essential whether the element 14 be above the element 13 as shown in the drawings, or whether it be below, in so far as the operation of the device is concerned. In either case these elements 14 carry the month name groupings as shown in Figures 3 and 4 for regular and leap years respectively. Alternatively, the element 14 may assume the forms shown in either Figure 8 or Figure 9, as endless sleeves or bands, or as essentially flat planar elements as shown in Figures 3 and 4.

A framing and masking element 15 is arranged concentrically with respect to elements 13 and 14, and is of sufficiently larger internal diameter as to cover both of these elements as appears in Figures 1 and 2. The masking element 15 is provided with an aperture 16 and an aperture 17 for revealing to view the number data tabulation element 13 and the month names groupings of the element 14, respectively. Although two apertures are shown in the drawings, a single aperture of selective form may be adopted for this purpose. The relationship of the apertures 16 and 17 to the underlying data are shown in broken lines in Figures 5 and 4, respectively.

It will be understood from the described arrangement of parts that the elements 13, 14 and 15 are each relatively moveable with respect to the others, so that any desired grouping of numbers may be presented through the large viewing aperture 16 of the masking element 15 and any month name grouping may be presented through the smaller aperture 17 of the masking element without regard to the association of the two former.

In order to effect the correct correlation between any particular month and the days of the week, there is provided on the number data element 13 a series of yearly indicia 18 with accompanying reference or datum points 19, for use in association with corresponding reference or datum points 20 on the month group elements 14. These latter are preferably aligned with the month of January for the purposes already discussed, although any other more convenient reference month may be adopted. In the drawings, since it is impossible to show differences in color, yearly indicia 18, demarking leap years, have been set forth in parenthesis, as will be seen in Figure 5, and the applicable datum point 20 on the leap year month groupings has been indicated in parenthesis as shown in Figure 4. This is to insure that the parenthetical years being leap years and the parenthetical datum point of the monthly groupings will be used in association with each other, although ordinarily these differences would be set forth in contrasting colors to direct the user always to use like colors in effecting the correct association of parts.

To insure that once the parts have been brought into the proper relationship, the relationship will not be disturbed, the confronting edges of the number data element 13 and the month names element 14 may be provided with serrations 21 which cog together to prevent accidental displacement of the parts. This may conveniently be effected by using notches 22, shown in broken lines of Figure 5, with a depending tongue 23 shown in broken lines in Figure 4, which, in addition to preventing the displacement between these elements, corresponds with the yearly indicia and datum points to be effective as indicators without regard to printed datum marks. If this form is to be adopted, the remaining confronting edges of the elements 13 and 14 may be smoothly cut.

As is indicated in Figures 3 and 4, separate bands 14 for the monthly grouping for the regular years and leap years may be employed for use interchangeably with the number datum group 13. While one is in use, the other may be placed away in safe keeping in the interior of the container shown in Figures 1 and 2, if this form be adopted. More conveniently, however, the month groups for leap years and regular years are preferably associated in a single band which, if the diametric extent of the assembly is large enough, may take the form of an endless band shown in Figure 9, or if a cylindrical assembly of smaller diameter is contemplated, may take the form shown in Figure 8, in which the top edge of one group is contiguous with the top edge of the other group, so as to present the month names of each in inverted relation to each other. By lifting this device from association with the number data element 13, and by inverting it and replacing it in association with the latter, leap year and regular years month groupings may be conveniently and expeditiously substituted for each other. Obviously, in such case, the aperture 17 of the mask element 15 will be so disposed as to display only the month groupings of the year in question.

As an alternate arrangement, the elements 14 of Figures 3 and 4 may be arranged in endless association as shown in Figure 9, whereupon one half of the area is applicable to regular years and the other half is applicable to leap years, as shown in this figure. It only remains to lift and turn the band of Figure 9 with relation to the number data element 13 until the reference—or datum—point 20, and/or tongue 23 are brought into registration with the yearly indicia datum point 19 of the element 13 for the year in question (or with the corresponding notch 22, if this form be adopted) correctly to set the calendar for use. By dropping the masking element 15 in place, only the correct association of the underlying elements is had, and by turning this element until the correct month appears in the aperture 17, the calendar is correctly adjusted for that month. The days of the week, which are indicated above the large viewing aperture 16 on the element 15, will correctly register with, and correspond to, the number data viewed through that aperture from the underlying number data element 13.

In Figure 7, the several elements 13, 14 and 15 are made in the form of split rings and are of a resilient material, such as thin sheet metal, Celluloid, or other plastic embodiments. In this manner, the edges 24 of the elements 13 and 14 may be separated to vary their effective diameter in order that they may be snapped into position about any available cylindrical object as, for example, ink wells, cigarette boxes, pencils, pens, etc., as well as pipes and structural columns. Similarly, the masking element 15 is correspondingly split opposite its viewing aperture, the split edges 25 of which may be extended to the necessary diameter to overlie the elements 13 and 14, upon which it is snapped in place in the same manner. The operational relationships of the several parts are identical with that already described, and the calendar may be set and operated accordingly. This embodiment is to convert familiar objects into calendars, thus to increase the utility of invention and to minimize its cost.

It will be observed that the month group designations shown in Figures 3 and 4 occur in seven groupings which are repeated in the same order until there are a sufficient number of groupings to correspond to the number of columns in the number table of element 13. This allows greater flexibility and simplifies bringing the calendar into proper adjustment without regard to turning the masking element 15 into odd positions with respect to the number table. Since the masking element carries the week day designations, and since Wednesday is the center week day, it is convenient, as a matter of basic construction, to align the month viewing aperture 17 on center with the designation for Wednesday. Then, even in the absence of the yearly indicia and reference marks 19 and 20 between the two elements, it is possible to use the calendar by setting the month grouping for January over the date of the first Wednesday for that calendar year. In the absence of a leap year month grouping element, it is possible to accommodate leap years by using the calendar as already described for January and February, and then on March 1 of leap year, the extra day having already been accounted for as February 29, set the March month designation over the date of any Wednesday for that particular month. Then the month of March is properly aligned, and the succeeding months will follow along correctly by adjusting the masking element 15 in the manner already described.

It is considered desirable, however, to provide for the leap year month groupings separately in order that the chances for error on the part of the user may be essentially eliminated. The same is true of providing the yearly indicia and reference marks between the elements 13 and 14, since this eliminates the necessity for having a set calendar on hand to refer to, or any other recourse to the order of dates occurring throughout the year, for the purpose of initially setting the calendar. To use the calendar of the present invention, it is only necessary to know the year in question and to set the datum reference point 20 of the month grouping band 14 upon the yearly index 19 for that year, and turn the masking element 15 until the prevailing month appears in the aperture 17. The calendar is then correctly established for that month and may, by turning the masking element to successive month-name positions, be relied upon as correctly showing the calendar for each succeeding month throughout the year.

In the modification of Figure 10, it will be seen that the relatively large number data element 13 is made of stock that is thicker than the element 14 which contains the month name groupings. This affords a clearance between the element 14 and the overlying framing and masking element 15 in order that the lighter mass of the former will not be accidentally displaced when the masking element 15 is turned into various positions incident to its use. A corresponding clearance is not necessary between the masking element 15 and the number element 13, since the latter presents a large area for frictional contact with the upstanding walls 11 of the base which it snugly engages. The frictional resistance between the walls 11 and the element 13 will be sufficient to cause the latter to remain in position irrespective of frictional engagement between the elements 13 and 15. The month grouping element 14, however, presenting as it does considerably less area for frictional contact with the walls 11, is preferably left free of any frictional engagement with the masking element 15, by being spaced therefrom a distance equal to, or slightly greater than, the difference in the thickness of the stocks of which the elements 13 and 14 are made, respectively. This may be seen in Figure 10. By adopting this construction it is not necessary to provide the contiguous edges of the elements 13 and 14 with the serrations 21, or with the notches 22 and tongues 23, described above. The frictional engagement between the elements 13 and 14 with the walls 11 will be sufficient to retain the parts in the selected relationships, notwithstanding the movement of the framing and masking element 15.

Figure 11:
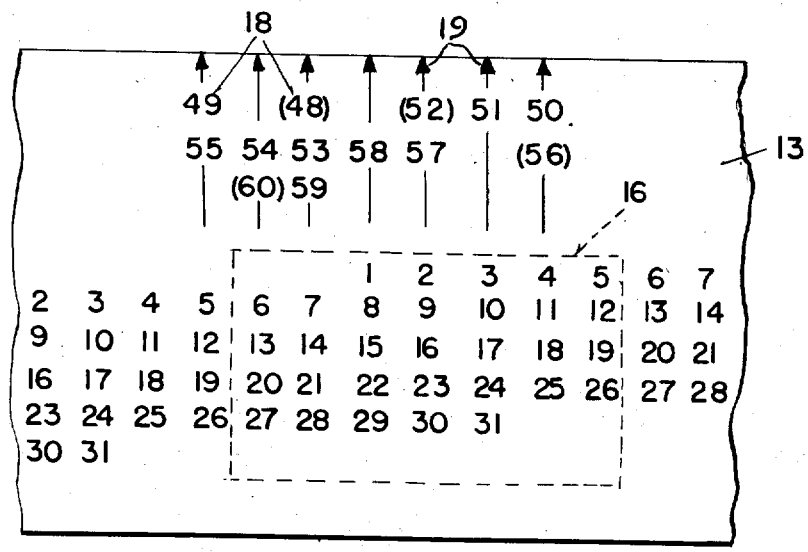

In Figure 11 there is shown an arrangement wherein a considerable number of years may be provided without confusion or mutual interference. In this case, the yearly indicia 18 are reduced to the years of the century by excluding the century numbers which are usually in prefix therewith. This reduces the space required for the accommodation of any number of years and permits several to be applied to one indicia mark 19 as the situation might require. The particular arrangement shown in Figure 11 provides a calendar that covers the span of years from 1948 to 1960, and still other years might be added in this fashion to lengthen the period of usefulness of the calendar.

I claim as my invention:

1. A calendar comprising a cylindrical date table, a month group list of cylindrical form mounted on said table in coaxial movable relationship thereto; a yearly index on said table having reference points at the edge of its surface adjacent to the month group list; a datum point on said list for use in reference to the reference points of the yearly index, and a cylindrical sleeve masking inapplicable portions of said table and list having means for revealing a month group and a block of dates representative of one month of said group, and week day designations carried on said sleeve for alignment with the block of dates revealed thereby.

2. A perpetual calendar comprising a cylindrical hollow base member, a cylindrical date band surrounding said base member in frictional engagement with outer cylindrical walls of said base member, a cylindrical month band surrounding said base member in edge-to-edge contiguity with said cylindrical date band, both of said cylindrical bands being movable with respect to said base member and to each other, means fastening said bands together, and a cylindrical masking element surrounding both of said bands and base member in sliding engagement therewith, said element having apertures to expose portions of said bands to simultaneous view.

3. The invention according to claim 3 in which the date band is thicker than said month band to the effect that the masking element and month band are spaced apart by a clearance equal at least to the difference in thickness of said bands.

THOMAS F. PETERSON, JR.

REFERENCES CITED

The following references are of record in the file of this patent:

UNITED STATES PATENTS

| Number | Name | Date |
|---|---|---|
| 176,183 | Jones | Apr. 18, 1876 |
| 201,831 | Ratcliff | Mar. 26, 1878 |
| 1,692,392 | Stevenson | Nov. 20, 1928 |

Certificate of Correction

Patent No. 2,567,395 September 11, 1951

THOMAS F. PETERSON, Jr.

It is hereby certified that error appears in the printed specification of the above numbered patent requiring correction as follows:

Column 8, line 23, for the claim reference numeral "3" read *2*; and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*